(12) United States Patent
Bamberger et al.

(10) Patent No.: US 10,320,192 B2
(45) Date of Patent: Jun. 11, 2019

(54) METHOD FOR THE COMPUTER-ASSISTED CONFIGURATION OF AN ELECTRICAL POWER GRID

(71) Applicant: SIEMENS AKTIENGESELLSCHAFT, München (DE)

(72) Inventors: Joachim Bamberger, München (DE); Ulrich Münz, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 367 days.

(21) Appl. No.: 15/037,709

(22) PCT Filed: Aug. 5, 2014

(86) PCT No.: PCT/EP2014/066812
§ 371 (c)(1),
(2) Date: May 19, 2016

(87) PCT Pub. No.: WO2015/078598
PCT Pub. Date: Jun. 4, 2015

(65) Prior Publication Data
US 2016/0301210 A1    Oct. 13, 2016

(30) Foreign Application Priority Data

Nov. 26, 2013  (DE) .......................... 10 2013 224 156
Nov. 28, 2013  (DE) .......................... 10 2013 224 411

(51) Int. Cl.
*H02J 3/00*   (2006.01)
*H02J 3/16*   (2006.01)
(Continued)

(52) U.S. Cl.
CPC .............. *H02J 3/16* (2013.01); *G06Q 50/06* (2013.01); *H02J 3/18* (2013.01); *H02J 3/383* (2013.01);
(Continued)

(58) Field of Classification Search
None
See application file for complete search history.

(56) References Cited

U.S. PATENT DOCUMENTS 8,676,392 B2 *  3/2014  Arinaga ................. F03D 7/028
                                                       290/44
2010/0067271 A1 *  3/2010  Garces ...................... H02J 3/16
                                                        363/95
(Continued)

FOREIGN PATENT DOCUMENTS

EP              2521237 A1   11/2012
WO      WO 2012037989 A2    3/2012

OTHER PUBLICATIONS

Translation of Bamberger et al., WO 2012/037989 A2; Mar. 29, 2012.*

(Continued)

*Primary Examiner* — Jared Fureman
*Assistant Examiner* — Joel Barnett
(74) *Attorney, Agent, or Firm* — Schmeiser, Olsen & Watts, LLP

(57) ABSTRACT

A method for the computer-assisted configuration of an electrical power grid is provided. Grid forming generating unit nodes are provided in the power grid as first grid nodes and grid-boosting generating unit nodes are optionally provided as second grid nodes. The latter nodes are regenerative energy generation plants such as, for example, photovoltaic systems. In the method, closed-loop control methods and in particular proportional control of the generating unit nodes (Continued)

are set on the basis of a suitable dynamic model of the power grid such that an optimization problem is solved with the aim of optimum operation of the power grid in respect of one or more optimization criteria.

19 Claims, 1 Drawing Sheet

(51) Int. Cl.
 *H02J 3/18* (2006.01)
 *H02J 3/38* (2006.01)
 *G06Q 50/06* (2012.01)
(52) U.S. Cl.
 CPC ......... *H02J 3/386* (2013.01); *H02J 2003/007* (2013.01); *Y02E 10/563* (2013.01); *Y02E 40/34* (2013.01); *Y02E 40/76* (2013.01); *Y02E 60/76* (2013.01); *Y04S 10/545* (2013.01); *Y04S 40/22* (2013.01)

(56) References Cited

U.S. PATENT DOCUMENTS

| | | |
|---|---|---|
| 2012/0249278 A1 | 10/2012 | Krok et al. |
| 2013/0268131 A1* | 10/2013 | Venayagamoorthy .... G05F 5/00 700/286 |

OTHER PUBLICATIONS

Lopes L.A.C. et al: PV Hybrid Mini-Grids: Applicable Control Methods for Various Situations, International Energy Agency: Photovoltaic Power Systems Programme, 2012.
Scherer C. et al: Linear Matrix Inequalities in Control; lecture notes, http://www.dcsc.tudelft.nl/~cscherer/lmi/notes05.pdf (2005).
Rocabert J. et al: Control of Power Converters in AC Microgrids; IEEE Transactions on Power Electronics; vol. 27 No. 11; pp. 4734-4749; 2012.
Jostock M. et al: Structured Analysis of Arbitrary Island Grids, 4th IEEE PES Innovative Smart Grid Technologies Europe (ISGT Europe), Oct. 6-8, 2013, Kopenhagen.
International Search Report; PCT/EP21014/066812; Filed: Aug. 5, 2014; 2 pgs.

* cited by examiner

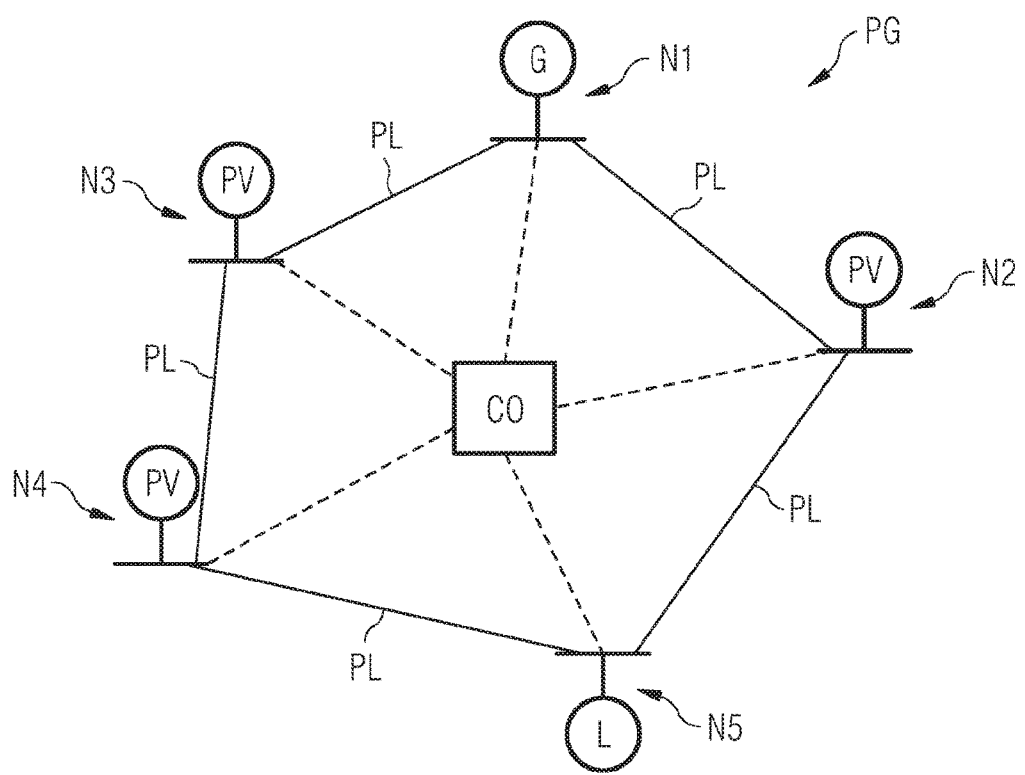

METHOD FOR THE COMPUTER-ASSISTED CONFIGURATION OF AN ELECTRICAL POWER GRID

CROSS-REFERENCE TO RELATED APPLICATIONS

This application claims priority to PCT Application No. PCT/EP2014/066812, having a filing date of Aug. 5, 2014, based off of DE Application No. 102013224411.8 having a filing date of Nov. 28, 2013 and DE 102013224156.9, having a filing date of Nov. 26, 2013, the entire contents of which are hereby incorporated by reference.

FIELD OF TECHNOLOGY

The following relates to a method for the computer-assisted configuration of an electrical power grid and to a corresponding apparatus and to an electrical power grid.

BACKGROUND

Electrical power grids comprise a plurality of grid nodes which are connected via power lines and in which electrical energy is produced or from which electrical energy is removed. In this case, the grid nodes are often controlled within the scope of proportional control in which the voltage and frequency of the individual nodes and their active power and reactive power which are fed in are set for said nodes. A distinction is made between grid-forming producer nodes and grid-supporting producer nodes. In a grid-forming producer node, which is also referred to as a voltage-controlled producer node, the amplitude and frequency of the voltage in this node are set within the scope of the proportional control. In contrast, in a grid-supporting producer node, which is also referred to as a current-controlled producer node, the active power and reactive power fed in are controlled within the scope of the proportional control.

In modern power grids, grid-supporting producer nodes are often regenerative energy production plants which contain power electronics, for example inverters, which are designed only for a particular maximum current. In the event of excessive fluctuations in the load in the power grid, the power grid may become unstable on account of current limitation of the grid-supporting producer nodes, which, under certain circumstances, may result in failure of the power grid. Consequently, the operation of the grid-supporting producer nodes is generally designed in such a manner that the maximum current is not reached in the event of sudden load changes. However, this results in the proportion of energy which is provided via regenerative energy production in the power grid being limited. This increases the power production costs since grid-forming producer nodes are increasingly being used for this purpose and are generally conventional generators, for example diesel generators or gas turbines.

Only a few approaches relating to how the proportion of regenerative energy production can be increased in a power grid are known from the prior art. Document [1] describes power grids in the form of so-called micro grids having a high proportion of regenerative energy production. However, large and overdimensioned electrical energy stores are used as grid-forming nodes in such grids. Simulation methods which are used to simulate different load changes in the grid are also known for the purpose of optimizing power grids. However, these methods are computationally intensive and can generally provide results only for a small number of possible load changes.

SUMMARY

An aspect relates to an electrical power grid easily and quickly using a computer-assisted method.

The method according to embodiments of the invention is used for the computer-assisted configuration of an electrical power grid. In this case, the method can be carried out in advance (off-line) before the power grid is activated. The method can likewise be carried out or repeated during operation of the power grid (online). The electrical power grid configured using the method comprises a plurality of grid nodes connected via power lines. These grid nodes comprise one or more first grid nodes. The first grid node(s) provide(s) active power for a load (for example a passive load) in the power grid during operation of the power grid and is/are therefore corresponding producer nodes. Depending on the embodiment, the load can occur at one point or at a plurality of points or nodes in the power grid.

A respective first grid node is a grid-forming producer node in the power grid, in which the amplitude and frequency of the voltage in this grid node are controlled, on the one hand, on the basis of the reactive power fed in by this grid node or the reactive current fed in by this grid node and, on the other hand, on the basis of the active power fed in by this grid node or the active current fed in by this grid node using a control method and, in particular, using proportional control. Such a control method or such proportional control is known per se. Within the scope of the proportional control, the amplitude of the voltage is proportional to the reactive power or the reactive current and the frequency of the voltage is proportional to the active power or the active current.

In the method according to embodiments of the invention, changes in the active power of the first grid nodes are determined for respective predefined changes in the active power of the load on the basis of a dynamic model of the power grid (that is to say a model which describes the temporal change in relevant variables in the power grid, such as voltages, powers and frequencies). In other words, the changes in the active power of the first nodes are described or modeled using a dynamic model of the power grid on the basis of predefined changes in the active power of the load and can therefore be calculated in a computer-assisted manner. The model described in document [2], for example, can be used as the dynamic model of the power grid. One preferred variant uses a model which is based on the assumption that the active power and reactive power produced in a grid node are immediately available in every other grid node. This model is explained in more detail in the detailed description. The assumption just described is equivalent in this case to the assumption of short (negligible) power lines between the grid nodes. Another preferred variant uses a model which uses a linearized load flow model.

In the method according to embodiments of the invention, the control methods for the respective first grid nodes are adjusted in such a manner that an optimization problem with the aim of operating the power grid in an optimum manner with respect to one or more optimization criteria is solved using the changes in the active power of the first grid nodes determined using the above model. Depending on the configuration, these optimization criteria and the aim may be stipulated differently. For example, the optimization criteria may be stipulated in such a manner that they result in low operating costs for the power grid. In one particularly preferred embodiment, the aim of the optimization problem is for as little of the active power provided for the load as possible to come from the first grid node(s). This therefore corresponds to the optimization criterion of providing as little active power as possible by means of the first grid node(s).

In one preferred embodiment of the method according to the invention, the grid nodes also comprise one or more second grid nodes which provide active power for the load in the power grid during operation of the power grid, wherein a respective second grid node is a grid-supporting producer node in the form of a regenerative energy production plant in which, on the one hand, the active power fed in by this grid node or the active current fed in by this grid node and, on the other hand, the reactive power fed in by this grid node or the reactive current fed in by this grid node are controlled on the basis of the frequency and amplitude of the voltage in this grid node using a control method and, in particular, using proportional control. Such a control method or such proportional control is likewise known per se. During proportional control, the active power fed in or the active current fed in is proportional in this case to the frequency of the voltage, and the reactive power fed in or the reactive current fed in is proportional to the amplitude of the voltage. Within the scope of this embodiment, changes in the active power of the second grid nodes are also determined for respective predefined changes in the active power of the load on the basis of the dynamic model of the power grid. In addition, the control methods for the respective first and second grid nodes are adjusted in such a manner that the optimization problem with the aim of operating the power grid in an optimum manner with respect to one or more optimization criteria is solved using the determined changes in the active power of the first and second grid nodes.

The method according to embodiments of the invention is based on the knowledge that the control methods for the producer nodes can be easily parameterized using a suitable dynamic model of the power grid in such a manner that predefined optimization criteria with respect to the operation of the power grid are satisfied. In one preferred variant, as much energy as possible is produced in this case in the power grid by means of regenerative energy production plants during optimum operation, thus keeping the power production costs low. The method is used, in particular, in a power grid in the form of an island grid in which the grid nodes are not connected to further power grids.

In one preferred variant of the method according to the invention, the control method in the grid-forming producer node is proportional control which comprises first proportional control and second proportional control.

According to the first proportional control based on a first proportionality factor and a reference active power assigned to the grid-forming producer node and a reference frequency assigned to the power grid, the frequency of the voltage in the grid-forming producer node is preferably stipulated on the basis of the active power fed in by the grid-forming producer node. In an alternative variant, according to the first proportional control based on a first proportionality factor and a reference active current assigned to the grid-forming producer node and a reference frequency assigned to the power grid, the frequency of the voltage in the grid-forming producer node is stipulated on the basis of the active current fed in by the grid-forming producer node.

According to the second proportional control based on a second proportionality factor and a reference reactive power assigned to the grid-forming producer node and a reference voltage assigned to the grid-forming producer node, the amplitude of the voltage in the grid-forming producer node is preferably stipulated on the basis of the reactive power fed in by the grid-forming producer node. In an alternative variant, according to the second proportional control based on a second proportionality factor and a reference reactive current assigned to the grid-forming producer node and a reference voltage assigned to the grid-forming producer node, the amplitude of the voltage in the grid-forming producer node is stipulated on the basis of the reactive current fed in by the grid-forming producer node.

In another embodiment, the control method in the grid-supporting producer node is proportional control which comprises third proportional control and fourth proportional control. According to the third proportional control based on a third proportionality factor and a reference active power assigned to the grid-supporting producer node and a reference frequency assigned to the power grid, the active power fed in by the grid-supporting producer node is preferably stipulated on the basis of the frequency of the voltage in the grid-supporting producer node. In an alternative variant, according to the third proportional control based on a third proportionality factor and a reference active current assigned to the grid-supporting producer node and a reference frequency assigned to the power grid, the active current fed in by the grid-supporting producer node is stipulated on the basis of the frequency of the voltage in the grid-supporting producer node.

According to the fourth proportional control based on a fourth proportionality factor and a reference reactive power assigned to the grid-supporting producer node and a reference voltage assigned to the grid-supporting producer node, the reactive power fed in by the grid-supporting producer node is preferably stipulated on the basis of the amplitude of the voltage in the grid-supporting producer node. In an alternative variant, according to the fourth proportional control based on a fourth proportionality factor and a reference reactive current assigned to the grid-supporting producer node and a reference voltage assigned to the grid-supporting producer node, the reactive current fed in by the grid-supporting producer node is stipulated on the basis of the amplitude of the voltage in the grid-supporting producer node.

In one particularly preferred embodiment, within the scope of adjusting the first and second proportional control and/or the third and fourth proportional control, the first and/or the second proportionality factor and/or the third and/or the fourth proportionality factor and/or the reference active power or the reference active current and/or the reference reactive power or the reference reactive current in the respective first and/or second grid nodes is/are determined. These variables are therefore used to adjust or parameterize the proportional control in the grid-forming or grid-supporting grid nodes.

In one variant of the invention, the optimization problem generally worded and defined above is minimization of the active power provided by the first grid node(s) under the secondary condition that the changes in the active power of the first and/or second grid nodes (and, in particular, of only the second grid nodes) are limited for the respective predefined changes in the active power of the load, that is to say do not exceed a predefined threshold value.

In a further variant, the optimization problem is given by minimization of the changes in the active power of the first and/or second grid nodes for the respective predefined changes in the active power of the load. In this case, only the minimization of the changes in the active power of the second grid nodes is preferably included in the optimization problem. This limits the magnitude of overshoots into the grid-supporting grid nodes, with the result that these grid nodes can be operated at a higher active power. Therefore, more active power is provided by the grid-supporting producer nodes, with the result that the optimization aim defined at the outset, according to which as little of the active power provided for the load as possible comes from the first grid nodes, is achieved.

In another variant of the method according to the invention, it is taken into account, as the secondary condition of the optimization problem, that the deviations of the frequencies of the voltages in the grid-forming and/or grid-supporting producer node(s) (in particular only in the grid-forming producer nodes) from a reference frequency assigned to the power grid are limited for the respective predefined changes in the active power of the load and/or the deviations of the amplitudes of the voltages in the grid-forming and/or grid-supporting producer node(s) (in particular only in the grid-forming producer nodes) from a reference voltage assigned to the respective grid-forming and/or grid-supporting producer node are limited for respective predefined changes in the reactive power of the load. This embodiment of the invention ensures stable grid operation with a largely constant voltage amplitude and voltage frequency in the grid nodes.

In another variant of the method according to embodiments of the invention, in order to determine the changes in the active power of the second grid nodes, a temporal change in the frequency and the amplitude of the voltage in the respective second grid nodes is estimated using a PLL algorithm (PLL=phase-locked loop).

In one preferred embodiment, the first grid node(s) comprise(s) one or more electrical energy stores, in particular batteries, and/or one or more electrical generators driven using fossil fuel or regeneratively produced fuel, for example diesel generators, in the power grid configured using the method according to embodiments of the invention. In one preferred variant, the second grid nodes are one or more photovoltaic plants and/or wind power plants.

In addition to the method described above, embodiments of the invention relates to an apparatus for the computer-assisted configuration of an electrical power grid, wherein the apparatus is set up to carry out the method according to embodiments of the invention or one or more preferred variants of the method according to the invention.

In addition, embodiments of the invention relates to an electrical power grid which comprises the apparatus according to embodiments of the invention described above.

BRIEF DESCRIPTION

Some of the embodiments will be described in detail, with reference to the following FIGURES, wherein like designations denote like members, wherein:

FIG. 1 shows an embodiment of a power grid in a form of an island grid in which one embodiment of the method according to the invention is carried out.

DETAILED DESCRIPTION

The power grid PG shown in FIG. 1 comprises the grid nodes N1, N2, N3, N4 and N5 which are connected to one another via power lines PL. In this case, the grid nodes N1 to N4 are producer nodes, in which case the grid node N1 is a generator node G in the form of a diesel generator and the grid nodes N2, N3 and N4 are regenerative energy production plants in the form of photovoltaic plants PV. The generator node N1 is a grid-forming producer node (also referred to as a voltage-controlled producer node), whereas the regenerative energy production plants N2 to N4 are grid-supporting producer nodes (also referred to as current-controlled producer nodes). These two types of grid nodes differ in terms of their proportional control, as described in more detail further below.

The producer nodes N1 to N4 provide active power for the passive load L which is present in the grid and, in the exemplary embodiment in FIG. 1, is represented by a load node N5. Alternatively, however, the load may also occur at different locations or at a plurality of nodes in the power grid. In order to suitably configure or control the power grid, provision is made of a central control unit CO which communicates with the individual nodes, as indicated by dashed lines. One embodiment of the method according to the invention is carried out in this control unit. In particular, corresponding parameters of the proportional controllers implemented in the nodes are suitably adjusted.

According to the variant of the method according to the invention described here, an optimization problem is solved in a computer-assisted manner upon activation of the power grid or if necessary even during operation in order to stipulate parameters of the proportional controllers in such a manner that, in the event of rapid changes in the active power and reactive power of the load, the change in the active and reactive powers of the regenerative producer nodes which is caused thereby is limited and as little of the active power provided for the load as possible is provided by the generator node G. The optimization is carried out on the basis of a model of the power grid which is based on the assumption of short power lines between the grid nodes. This model and the corresponding optimization are explained in more detail below. If appropriate, a different model of the power grid can also be used, instead of the model described below, to formulate the optimization problem, for example the model described in document [2].

As already mentioned, the model used here is based on the assumption of short power lines, which means that the phase differences between adjacent grid nodes tend toward zero. In other words, the model is based on the assumption that the active power and reactive power produced in a grid node of the power grid are available immediately (that is to say instantaneously or without a time delay) in every other grid node of the power grid.

In the method described below, the power grid PG in FIG. 1 which comprises a single grid-forming generator node in the form of a diesel generator is taken as a basis. However, the method can also be used for a plurality of grid-forming grid nodes, in which case the grid-forming nodes may also be other types of generators (for example gas turbines) or electrical energy stores. In addition, the grid-forming producer node, which is specified below by the index M (M=master), may also comprise a plurality of identical units which are operated in a parallel manner, with the result that they are modeled as an aggregated individual producer node.

As mentioned, the grid PG in FIG. 1 comprises a plurality of grid-supporting producer nodes which are denoted below using indices i and j, in which case the total number of grid-supporting producer nodes is also specified by the variable N. In this case, more than three of the grid-supporting producer nodes illustrated in FIG. 1 can be provided. The grid-supporting producer nodes may also completely or partially be regenerative energy production plants other than photovoltaic plants, for example wind power plants.

The passive load L occurring in the power grid is given as follows in the model described here:

$$P_L = \frac{U^2}{R_L} \tag{1a}$$

$$Q_L = \frac{U^2}{X_L} \tag{1b}$$

In this case, U denotes the voltage amplitude and $R_L$ is the non-reactive resistance (or effective resistance) and $X_L$ is the reactance of the load L.

With the above assumption of short power lines, the active power and reactive power of the grid-forming producer node M are described by the following equations:

$$P_M = P_L - \Sigma_{j=1}^N P_{Cj} \tag{2a}$$

$$Q_M = Q_L - \Sigma_{j=1}^N Q_{Cj} \tag{2b}$$

In this case, $P_M$ denotes the active power and $Q_M$ denotes the reactive power provided by the grid-forming producer node. $P_{Cj}$ is the active power and $Q_{Cj}$ is the reactive power provided by the jth grid-supporting producer node (that is to say the corresponding inverter of the regenerative energy production plant).

The grid-forming producer node M in the form of the diesel generator G uses proportional control in which the frequency and the voltage of the diesel generator are set on the basis of the active power and reactive power fed in by this node. The proportional control for setting the frequency f(P) and the voltage U(Q) is as follows:

$$f = f_0 - \frac{1}{k_M^f}(P_M - P_{M,0}) \tag{2c}$$

$$U = \tag{2d}$$
$$U_M = U_{M,0} - k_M^Q(Q_M - Q_{M,0}) = U_{M,0} - k_M^Q\left(Q_L - \sum_{j=1}^N Q_{Cj} - Q_{M,0}\right)$$

In this case, f and U respectively denote the frequency and voltage for the producer node M. $k_M^f$ is the (inverse) droop gain for the frequency control and $k_M^Q$ is the droop gain for the voltage control, in which case these droop gains are proportionality factors in the sense of the claims. Furthermore, $f_0$ corresponds to a reference frequency in the power grid, which represents the rated frequency of the grid (for example 50 Hz). In addition, $P_{M,0}$ is a reference active power, $U_{M,0}$ is a reference voltage and $Q_{M,0}$ is a reference reactive power of the proportional control.

Alternatively, the grid-forming producer node M can use proportional control in which the frequency and the voltage of the diesel generator are set on the basis of the active current and reactive current fed in by this node. The proportional control for setting the frequency $f(I_{PM})$ and the voltage $U(I_{QM})$ is as follows:

$$f = f_0 - \frac{1}{k_M^f}(I_{PM} - I_{PM,0}) \tag{2e}$$

$$U = U_M = U_{M,0} - k_M^Q(I_{QM} - I_{QM,0}) \tag{2f}$$

In this case, $I_{PM,0}$ is the reference active current and $I_{QM,0}$ is the reference reactive current of the proportional control. The variables $I_{PM}$ and $I_{QM}$ denote the active and reactive currents currently being fed in. In the further embodiment, only the variant (2c), (2d) is used. On account of the approximate equivalences $$I_{PM} \approx \frac{P_M}{\sqrt{3}\,U_N} \text{ and } I_{QM} \approx \frac{Q_M}{\sqrt{3}\,U_N}$$

($U_N$ corresponds to the rated voltage), the following equations can also be used for the case (2e), (2f) by scaling the droop gains $k_M^f$ and $k_M^Q$ with the factor $\sqrt{3}U_N$.

It should be noted that the above equation (2c) represents the steady state of the diesel generator. Grid-forming diesel generators have a rotating mass with a moment of inertia m and a damping factor D which is very small. The rotating mass rotates in sync with the grid frequency f in the steady state. In this case, the diesel generator supplies a mechanical power $P_{mech}$ in order to obtain the above steady frequency f according to equation (2c). The mechanical power $P_{mech}$ of the diesel generator is given as follows:

$$P_{mech} = P_{M,0} - k_M^f(f - f_0) \tag{2g}$$

With the known model of the rotating mass and the above equation (2a), the following is obtained therefrom:

$$m\dot{f} + Df = P_{mech} - P_M = P_{M,0} - k_M^f(f - f_0) - P_L + \Sigma_{j=1}^N P_{Cj} \tag{2h}$$

Since D is negligibly small and $\dot{f}=0$ in the steady state, $P_{mech} = P_M$ results therefrom. The frequency control of the equation (2c) therefore results in combination with equation (2e).

If an electrical energy store is used instead of a diesel generator as the grid-forming producer node, the following equations (2i) and (2j) are used instead of the equations (2c) and (2d) as proportional control:

$$f = f_M = f_0 - k_M^P(P_M - P_{M,0}) = f_0 - k_M^P(P_L - \Sigma_{j=1}^N(P_{Cj}) - P_{M,0}) \tag{2i}$$

$$U = U_M = U_0 - k_M^P(Q_M - Q_{M,0}) = U_0 - k_M^P(Q_L - \Sigma_{j=1}^N(Q_{Cj}) - Q_{M,0}) \tag{2j}$$

In this case, corresponding droop gains $k_M^P$ and $k_M^Q$ and reference values $P_{M,0}$, $U_{M,0}$ and $Q_{M,0}$ are again stipulated. $f_0$ corresponds to the above reference frequency in the power grid. Alternative embodiments with active current and reactive current are $$f = f_M = f_0 - k_M^P(I_{PM} - I_{PM,0}) \tag{2k}$$

$$U = U_M = U_{M,0} - k_M^Q(I_{QM} - I_{QM,0}) \tag{2l}$$

In this case, corresponding reference values $I_{PM,0}$ and $I_{QM,0}$ are again stipulated. As described above, the equations (2k), (2l) can be used instead of (2i), (2j) if the associated droop gains $k_M^P$ and $k_M^Q$ are scaled with the factor $\sqrt{3}U_N$.

In contrast to the grid-forming producer node M, the proportional control for the ith grid-supporting producer node is as follows:

$$P_{Ci} = P_{Ci,0} - k_{Ci}^P(f_{Ci} - f_0) \tag{3a}$$

$$Q_{Ci} = Q_{Ci,0} - k_{Ci}^Q(U_{Ci} - U_{Ci,0}) \tag{3b}$$

In this case, $P_{Ci}$ is the active power and $Q_{Ci}$ is the reactive power in the ith grid-supporting producer node, which are adjusted on the basis of the frequency $f_{Ci}$ and voltage $U_{Ci}$ in the ith grid-supporting producer node. The values $P_{Ci,0}$, $Q_{Ci,0}$, $f_0$, $U_{Ci,0}$ are again reference points of the proportional control and correspond to a reference active power, a reference reactive power, the reference frequency already defined above and a reference voltage. The variables $k_{Ci}^P$, $k_{Ci}^Q$ are again droop gains which correspond to the proportionality factors in the sense of the claims.

Alternative embodiments are:

$$I_{PCi}=I_{PCi,0}-k_{Ci}^P(f_{Ci}-f_0) \quad (3c)$$

$$I_{QCi}=I_{QCi,0}-k_{Ci}^Q(U_{Ci}-U_{Ci,0}) \quad (3d)$$

In this case, $I_{PCi}$ is the active current and $I_{QCi}$ is the reactive current in the ith grid-supporting producer node, which are adjusted on the basis of the frequency $f_{Ci}$ and voltage $U_{Ci}$ in the ith grid-supporting producer node. The values $I_{PCi,0}$, $I_{QCi,0}$ correspond to a reference active current and a reference reactive current. As described above, the equations (3c), (3d) can be used instead of (3a), (3b) if the associated droop gains $k_{Ci}^P$ and $k_{Ci}^Q$ are scaled with the factor $\sqrt{3}U_N$.

The exemplary embodiment is continued with the variant (3a), (3b).

Within the scope of the modeling of the power grid described here, the dynamics of the grid-supporting producer nodes are described by a PLL algorithm which has a low-pass behavior in a first approximation. This algorithm estimates the frequency and the voltage in the ith grid-supporting producer node by means of the values $f_{Ci}$ and $U_{Ci}$ as follows:

$$\dot{f}_{Ci} = -\frac{1}{T_{Ci}^f}(f_{Ci} - f) \quad (3e)$$

$$\dot{U}_{Ci} = -\frac{1}{T_{Ci}^U}(U_{Ci} - U) \quad (3f)$$

In this case, $T_{Ci}^f$, $T_{Ci}^U$ denote time constants, the value of which can be suitably stipulated by a person skilled in the art. f and U are the frequency and voltage in the grid-forming producer node.

Combining the above equations results in the following dynamic model for the active power and the frequency for an island grid containing a single diesel generator as the grid-forming producer node and a plurality of grid-supporting producer nodes:

$$\frac{d}{dt}\begin{pmatrix} f \\ f_C \end{pmatrix} = \begin{pmatrix} -\frac{D+k_M^f}{m} & -\frac{1}{m}(k_C^P)^T \\ (T_C^f)^{-1} & -\mathrm{diag}((T_C^f)^{-1}) \end{pmatrix}\begin{pmatrix} f \\ f_C \end{pmatrix} + \quad (4a)$$

$$\frac{1}{m}\begin{pmatrix} k_M^f + 1^T k_C^P & -1 & 1 & +1^T \\ 0 & 0 & 0 & 0 \end{pmatrix}\begin{pmatrix} f_0 \\ P_L \\ P_{M,0} \\ P_{C,0} \end{pmatrix}$$

$$\begin{pmatrix} f \\ P_C \end{pmatrix} = \begin{pmatrix} 1 & 0 \\ 0 & -\mathrm{diag}(k_C^P) \end{pmatrix}\begin{pmatrix} f \\ f_C \end{pmatrix} + \begin{pmatrix} 0 & 0 & 0 & 0 \\ k_C^P & 0 & 0 & I \end{pmatrix}\begin{pmatrix} f_0 \\ P_L \\ P_{M,0} \\ P_{C,0} \end{pmatrix} \quad (4b)$$

In this case, the vectors in the equations (4a) and (4b) are defined as follows:

$f_C = \mathrm{vec}(f_{Ci}), k_C^P = \mathrm{vec}(k_{Ci}^P), T_C^f = \mathrm{vec}(T_{Ci}^f), P_C = \mathrm{vec}(P_{Ci}),$
$P_{C,0} = \mathrm{vec}(P_{Ci,0})$ $f_C = \mathrm{vec}(f_{Ci}), k_C^P = \mathrm{vec}(k_{Ci}^P), T_C^f = \mathrm{vec}(T_{Ci}^f),$
$P_C = \mathrm{vec}(P_{Ci}), P_{C,0} = \mathrm{vec}(P_{Ci,0})$ $1 = \mathrm{vec}(1), (T_C^f)^{-1} = \mathrm{vec}\left(\frac{1}{T_{Ci}^f}\right)$ Furthermore, the following dynamic model results for the reactive power and the voltage:

$$\dot{U}_C = -\mathrm{diag}((T_C^U)^{-1})(I + \mathrm{diag}(k_C^Q))U_C + \quad (5a)$$

$$(T_C^U)^{-1}\begin{pmatrix} 1 & (k_C^Q)^T & -k_M^Q & k_M^Q & k_M^Q 1^T \end{pmatrix}\begin{pmatrix} U_{M,0} \\ U_{C,0} \\ Q_L \\ Q_{M,0} \\ Q_{C,0} \end{pmatrix}$$

$$\begin{pmatrix} U \\ Q_C \end{pmatrix} = \quad (5b)$$

$$\begin{pmatrix} -k_M^Q(k_C^Q)^T \\ -\mathrm{diag}(k_C^Q) \end{pmatrix}U_C + \begin{pmatrix} 1 & \mathrm{diag}(k_C^Q) & -k_M^Q & k_M^Q & k_M^Q 1^T \\ 0 & \mathrm{diag}(k_C^Q) & 0 & 0 & I \end{pmatrix}\begin{pmatrix} U_{M,0} \\ U_{C,0} \\ Q_L \\ Q_{M,0} \\ Q_{C,0} \end{pmatrix}$$

In this case, the vectors in the equations (5a) and (5b) are defined as follows:

$U_C = \mathrm{vec}(U_{Ci}), U_{C0} = \mathrm{vec}(U_{Ci,0}), k_C^Q = \mathrm{vec}(k_{Ci}^Q),$
$T_C^U = \mathrm{vec}(T_{Ci}^U), Q_C = \mathrm{vec}(Q_{Ci}), Q_{C,0} = \mathrm{vec}(Q_{Ci,0})$ The dynamics of the above equations (4a), (4b) and the dynamics of the above equations (5a), (5b) are coupled via the load equations (1a) and (1b) which couple the active power $P_L$ and the reactive power $Q_L$ of the load to the voltage U. However, it is assumed that the voltage amplitude U changes only marginally, with the result that the two dynamics are independent of one another.

On the basis of the above modeling, in the embodiment described here, an optimization problem is solved, according to which the energy production costs of the generator are minimized, that is to say most of the energy for the load L is intended to be produced by the regenerative grid-supporting producer nodes since this energy is considerably more cost-effective than producing the energy by burning fossil fuel. In this case, secondary conditions with respect to maximum transients (that is to say maximum temporal changes) of the active power in the grid-supporting producer nodes and with respect to the frequency and the voltage in the grid-forming producer node are taken into account. This ensures stable grid operation and also avoids overshoots in the grid-supporting producer nodes when producing the active power.

Mathematically, this optimization problem is represented as follows:

$$\min_{P_0, Q_0, \kappa} P_M \quad (6a)$$

Under the condition of equation (2a) (6b)

$$\|P_{Ci}(t)\|_\infty \leq P_{Ci,max} \forall i, \forall P_L \in TP_L \quad (6c)$$

$$\|f(t) - f_0\|_\infty \leq \Delta f_{max} \forall P_L \in TP_L \quad (6d)$$

$$\|U(t) - U_N\|_\infty \leq \Delta U_{max} \forall Q_L \in TQ_L \quad (6e)$$

The vectors in the equations are defined as follows:

$$P_0 = (P_{M,0}, P_{C,0})^T, Q_0 = (Q_{M,0}, Q_{C,0})^T, K = (k_M{}^f, (kCP)^T, k_M{}^Q, (k_C{}^Q)^T)^T$$

The variables $P_{Ci,max}$ are upper limits for the active power in the respective grid-supporting producer nodes. Furthermore, $\Delta f_{max}$ is an upper limit for frequency fluctuations and $\Delta U_{max}$ is an upper limit for voltage fluctuations in the grid-forming producer node. $U_N$ denotes a predefined rated voltage in the grid-forming producer node. $TP_L$ is a predefined set of possible load active power trajectories, that is to say a set of predetermined possible temporal changes in the active power of the load, from which it is assumed that these changes can occur in the power grid under consideration. In a similar manner, $TQ_L$ is a predefined set of possible reactive power trajectories, that is to say a set of predetermined possible temporal changes in the reactive power of the load, from which it is assumed that these changes can occur in the power grid under consideration. Furthermore, $\|\cdot\|_\infty$ denotes the infinity norm which is known per se and is the absolute maximum for all times $t \geq 0$ of the argument in the norm.

For the above equation (6a), $P_M$ is calculated using equation (2a) in combination with equations (4a) and (4b). In this case, the system of differential equations according to equation (4a) is solved and the resulting frequencies f and $f_c$ are inserted into equation (4b). This then results in $P_C$ which is then inserted into the equation (2a). The variable $P_{Ci}(t)$ from equation (6c) results from the fact that the system of differential equations according to equation (4a) is solved and the resulting frequencies f and $f_c$ are inserted into equation (4b). The frequency f(t) from equation (6d) is determined by solving the system of differential equations according to equation (4a). The variable U(t) results from the fact that the system of differential equations according to equation (5a) is solved and the resulting voltage $U_C$ is inserted into equation (5b).

The equation (6c) is used to avoid overshoots in the active powers of the grid-supporting producer nodes, with the result that the inverters in the photovoltaic plants are not damaged or disconnected. The equations (6d) and (6e) limit the frequency and voltage deviation in order to ensure stable grid operation and a good voltage quality. The optimization problem according to the equations (6a) to (6e) can be solved using methods known per se, for example using an $H_\infty$, $H_2$ or $l_1$ robustness analysis. Corresponding algorithms are found in document [3], for example. In particular, the above secondary conditions (6c), (6d), (6e) can be reformulated as matrix inequalities, which is likewise described in document [3]. The algorithms explained there for the conditions (6c), (6d) and (6e) also guarantee internal stability of the power grid with respect to load changes. Further secondary conditions may possibly be added, in particular upper and lower limits for elements of the vectors K, $P_0$ and $Q_0$.

Overall, suitable values for the proportionality factors and the reference active powers and the reference reactive powers of the proportional controllers in the grid-forming and grid-supporting producer nodes are determined on the basis of the solution to the above optimization problem. This achieves optimized energy production with the lowest possible production costs during operation of the power grid. In this case, the method can be determined on the basis of an (average) active power and reactive power of the load, for example before activating the power grid. The above method may likewise also possibly be used to update corresponding parameters of the proportional controllers in the case of a changing load in the power grid during operation of the power grid.

A second exemplary embodiment shows how it is possible to model the power grid having a plurality of grid-forming nodes and without the assumption of short power lines. In this case, the starting point is the PG in FIG. 1, but the producer nodes N1, N2, N3 and N4 are now each a grid-forming generator node in the form of a diesel generator or an energy store. The method can also be used for further grid-forming grid nodes in the form of other types of generators or additional grid-supporting nodes.

In contrast to the previous exemplary embodiment having negligible power lines, a linearized load flow model is now used to describe the active power and reactive power of the nodes:

$$P_i(t) \approx \sum_{j \in N_i} \left( \frac{U_{iN}}{r_{ij}^2 + x_{ij}^2} (r_{ij}(U_i(t) - U_j(t)) + x_{ij} U_{jN}(\theta_i(t) - \theta_j(t))) \right) \quad (7)$$

$$Q_i(t) \approx \sum_{j \in N_i} \left( \frac{U_{iN}}{r_{ij}^2 + x_{ij}^2} (x_{ij}(U_i(t) - U_j(t)) - r_{ij} U_{jN}(\theta_i(t) - \theta_j(t))) \right) \quad (8)$$

In this case, $P_i$ and $Q_i$ denote the active power and reactive power fed in by the node i. The power line between the nodes i and j has a resistance $r_{ij}$ and a reactance $x_{ij}$. The voltage amplitudes at the nodes i and j are $U_i$, $U_j$, in which case $U_{iN}$, $U_{jN}$ denote the rated voltages at the nodes i and j. The voltage phases at the nodes i and j are $\theta_i$, $\theta_j$. For the purpose of illustration, the temporally changeable variables are represented as a function of the time t, while all other variables are constant parameters. The set $N_i$ denotes all neighboring nodes of node i.

The equations (7) and (8) can also be stated in matrix form:

$$\begin{pmatrix} P \\ Q \end{pmatrix} = \begin{pmatrix} \text{diag}(U_{iN})G & -\text{diag}(U_{iN})B\text{diag}(U_{iN}) \\ -\text{diag}(U_{iN})B & -\text{diag}(U_{iN})G\text{diag}(U_{iN}) \end{pmatrix} \begin{pmatrix} U \\ \theta \end{pmatrix}$$

In this case, the vectors and matrices are defined as follows:

$$\theta = \text{vec}(\theta_i),\ U = \text{vec}(U_i),\ P = \text{vec}(P_i),\ Q = \text{vec}(Q_i).$$

$$G = [G_{ij}];$$

$$G_{ij} = \begin{cases} \sum_{j \in N_i} \dfrac{r_{ij}}{r_{ij}^2 + x_{ij}^2} & \text{for } i = j \\ -\dfrac{r_{ij}}{r_{ij}^2 + x_{ij}^2} & \text{for } i \neq j \end{cases}$$

$$B = [B_{ij}];$$

$$B_{ij} = \begin{cases} -\sum_{j \in N_i} \dfrac{x_{ij}}{r_{ij}^2 + x_{ij}^2} & \text{for } i = j \\ +\dfrac{x_{ij}}{r_{ij}^2 + x_{ij}^2} & \text{for } i \neq j \end{cases}$$

The voltage phases of the individual nodes can be calculated by integrating the voltage frequencies at the corresponding node. The voltage frequencies result for conventional generators from equation (2c) and for energy stores from equation (2h) as follows:

$$\dot{\theta}_i(t) = f_0 - \frac{1}{k_{Mi}^f}(P_{Mi}(t) - P_{Mi,0}) \quad (2c')$$

$$m_i\ddot{\theta}_i(t) + D_i\dot{\theta}_i(t) = P_{mech}(t) - P_{Mi}(t) = P_{Mi,0} - k_{Mi}^f(\dot{\theta}_i(t) - f_0) - P_{Mi}(t) \quad (2h')$$

In this case, $\dot{\theta}_i$ denotes the frequency at the producer node i. $k_{Mi}^f$ is the (inverse) droop gain for the frequency control at the node i, these droop gains being proportionality factors in the sense of the claims. Furthermore, $f_0$ corresponds to a reference frequency in the power grid, which represents the rated frequency of the grid (for example 50 Hz). In addition, $P_{Mi,0}$ is a reference active power. The parameters $m_i$ and $D_i$ describe the moment of inertia and the damping factor of the generator in the node i.

In a similar manner, the dynamics of the voltage amplitude $U_{Mi}$ for the grid-forming nodes i can be described in a similar manner to that in equations (30 and (2d) as follows:

$$\dot{U}_{Mi} = -\frac{1}{T_{Mi}^U}\left(U_{Mi} - U_{Mi,0} + k_{Mi}^Q(Q_{Mi} - Q_{Mi,0})\right) \quad (2d')$$

In this case, $T_{Mi}^U$ denotes a time constant, the value of which can be suitably stipulated by a person skilled in the art. $k_{Mi}^Q$ is the droop gain for the voltage control, these droop gains being proportionality factors in the sense of the claims. Furthermore, $U_{Mi,0}$ is a reference voltage and $Q_{Mi,0}$ is a reference reactive power of the proportional control in the node i.

The dynamic models of the grid-forming nodes (2c'), (2d'), (2h') can now be coupled to the load nodes (equations (1a) and (1b)) via the linearized load flow equation (7) (in this case, $P_{Mi}=P_i$ and $Q_{Mi}=Q_i$). As a result, the following equations are obtained in a similar manner to equations (4a) and (5a) in the previous exemplary embodiment:

$$\text{diag}(m_i)\ddot{\theta} + \text{diag}(D_i)(\dot{\theta}) + \text{diag}(k_{Mi}^f)(\dot{\theta} - f_0 1) = \quad (9a)$$
$$P_{M,0} - (\text{diag}(U_{iN})GU - \text{diag}(UiN)B\text{diag}(UiN)\theta$$

$$\text{diag}(T_{Mi}^U)\dot{U} = -U + U_{M,0} + \quad (9b)$$
$$\text{diag}(k_{Mi}^Q)(Q_{M,0} \pm (-\text{diag}(U_{iN})BU \pm \text{diag}(U_{iN})G\text{diag}(U_{iN})\theta))$$

$$\begin{pmatrix} P \\ Q \end{pmatrix} = \begin{pmatrix} \text{diag}(U_{iN})G & -\text{diag}(U_{iN})B\text{diag}(U_{iN}) \\ -\text{diag}(U_{iN})B & -\text{diag}(U_{iN})G\text{diag}(U_{iN}) \end{pmatrix} \begin{pmatrix} U \\ \theta \end{pmatrix} \quad (9c)$$

In this case, the vectors and matrices in the equations (9a), (9b) and (9c) are defined as follows:

$$\theta = \text{vec}(\theta_i), \; U = \text{vec}(U_i), \; P_{M,0} = \text{vec}(P_{Mi,0}),$$
$$U_{M,0} = \text{vec}(U_{Mi,0}), \; Q_{M,0} = \text{vec}(Q_{Mi,0}),$$
$$G = [G_{ij}];$$

$$G_{ij} = \begin{cases} \sum_{j \in N_i} \frac{r_{ij}}{r_{ij}^2 + x_{ij}^2} & \text{for } i = j \\ -\frac{r_{ij}}{r_{ij}^2 + x_{ij}^2} & \text{for } i \neq j \end{cases}$$

$$B = [B_{ij}];$$

$$B_{ij} = \begin{cases} -\sum_{j \in N_i} \frac{x_{ij}}{r_{ij}^2 + x_{ij}^2} & \text{for } i = j \\ +\frac{x_{ij}}{r_{ij}^2 + x_{ij}^2} & \text{for } i \neq j \end{cases}$$

In this case, $m_i=0$, $D_i=0$ apply to a grid-forming node to which an energy store is connected, and $m_i=0$, $D_i=0$, $k_{Mi}^f=0$, $k_{Mi}^Q=0$, $P_{Mi}=-P_{Li}$, $T_{Mi}^U=0$ apply to a load node. The resulting system of differential/algebraic equations can be converted by a person skilled in the art into a system of differential equations with an input $P_L$ and outputs P and Q.

An optimization problem can now be created in a similar manner to equations (6a) to (6e) with the aid of the dynamic model of the equations (9a) to (9c). In this exemplary embodiment, it is assumed that the various grid-forming producer nodes have different operating costs $c_i$ per power $P_{Mi}$ fed in. The cost vector is therefore $c=\text{vec}(c_i)$. The resulting optimization problem is therefore $$\min_{P_0,Q_0,K} c^T P_M \quad (10a)$$

Under the condition of equations (9a) to (9c) (10b)

$$\|P_{Mi}(t)\|_\infty \leq P_{Mi,max} \forall i, \forall P_L \in TP_L \quad (10c)$$

$$\|f(t)-f_0\|_\infty \leq \Delta f_{max} \forall P_L \in TP_L \quad (10d)$$

$$\|U(t)-U_N\|_\infty \leq \Delta U_{max} \forall Q_L \in TQ_L \quad (10e)$$

Suitable values for the proportionality factors and the reference active powers and the reference reactive powers of the proportional controllers in the grid-forming producer nodes and possibly also in grid-supporting producer nodes can be determined on the basis of the solution to this optimization problem.

The embodiments of the method according to the invention described above have a number of advantages. In particular, optimized operation of a power grid is easily achieved by means of a simple computer-assisted method which, on the basis of a model of the power grid, calculates suitable values for the proportional controllers of the grid nodes without complicated simulations having to be carried out for this purpose. In this case, the operation of the power grid is optimized such that as much energy as possible is provided by regenerative energy sources, but stable grid operation with low voltage and frequency fluctuations is achieved at the same time.

The invention claimed is:
1. A method for a computer-assisted configuration of an electrical power grid having a plurality of grid nodes, comprising:
providing a control unit,
providing one or more first grid nodes connected via power lines,
wherein the one or more first grid nodes are operably connected to the control unit,
wherein the one or more first grid nodes provides active power for a load in the power grid during operation of the power grid,
wherein a respective first grid node of the one or more first grid nodes is a grid-forming producer node in which an amplitude and a frequency of a voltage in the respective first grid node are controlled, on a basis of a reactive power fed in by the respective first grid node or the reactive current fed in by the respective first grid node and, on a basis of the active power fed in by the respective first grid node or the active current fed in by the respective first grid node using a control method, providing one or more second grid nodes which provide active power for the load in the power grid during operation of the power grid, wherein a respective second grid node of the one or more second grid nodes is a grid-supporting producer node in the form of a regenerative energy production plant in which, the active power fed in by the respective second grid node or the active current fed in by the respective second grid node and the reactive power fed in by the respective second grid node or the reactive current fed in by the respective second grid node are controlled on the basis of the frequency and amplitude of the voltage in the respective second grid node using the control method, wherein: the control method comprising:

determining changes in the active power of the respective first grid node for respective predefined changes in the active power of the load on a basis of a dynamic model of the power grid, wherein the dynamic model describes temporal changes in variables of the power grid, including voltages, powers, and frequencies;

determining changes in the active power of the one or more second grid nodes for respective predefined changes in the active power of the load on the basis of the dynamic model of the power grid; and adjusting the control methods for the respective first grid node and second grid node in such a manner that an optimization problem with an aim of operating the power grid in an optimum manner with respect to one or more optimization criteria is solved using the determined changes in the active power of the respective first grid nodes and the second respective grid node, wherein the aim of the optimization problem is for as little of the active power provided for the load as possible to come from the one or more first grid nodes.

2. The method as claimed in claim 1, wherein a power grid is operated in a form of an island grid without the one or more first grid nodes being connected to further power grids.

3. The method as claimed in claim 1, wherein, in the dynamic model of the power grid, the active power and the reactive power produced in a grid node are immediately available in every other grid node.

4. The method as claimed in claim 1, wherein the dynamic model of the power grid uses a linearized load flow model.

5. The method as claimed in claim 1, wherein the control method in the grid-forming producer node is proportional control which comprises a first proportional control and a second proportional control.

6. The method as claimed in claim 5, wherein:

according to the first proportional control based on a first proportionality factor and a reference active power assigned to the grid-forming producer node and a reference frequency assigned to the power grid, the frequency of the voltage in the grid-forming producer node is stipulated on the basis of the active power fed in by the grid-forming producer node; or according to the first proportional control based on the first proportionality factor and the reference active current assigned to the grid-forming producer node and the reference frequency assigned to the power grid, the frequency of the voltage in the grid-forming producer node is stipulated on the basis of the active current fed in by the grid-forming producer node.

7. The method as claimed in claim 5, wherein:

according to the second proportional control based on a second proportionality factor and a reference reactive power assigned to the grid-forming producer node and a reference voltage assigned to the grid-forming producer node, the amplitude of the voltage in the grid-forming producer node is stipulated on the basis of the reactive power fed in by the grid-forming producer node; or according to the second proportional control based on the second proportionality factor and the reference reactive current assigned to the grid-forming producer node and the reference voltage assigned to the grid-forming producer node, the amplitude of the voltage in the grid-forming producer node is stipulated on the basis of the reactive current fed in by the grid-forming producer node.

8. The method as claimed in claim 5 wherein the control method in the grid-supporting producer node is proportional control which comprises a third proportional control and a fourth proportional control.

9. The method as claimed in claim 8, wherein:

according to the third proportional control based on a third proportionality factor and a reference active power assigned to the grid-supporting producer node and a reference frequency assigned to the power grid, the active power fed in by the grid-supporting producer node is stipulated on the basis of the frequency of the voltage in the grid-supporting producer node; or according to the third proportional control based on the third proportionality factor and the reference active current assigned to the grid-supporting producer node and the reference frequency assigned to the power grid, the active current fed in by the grid-supporting producer node is stipulated on the basis of the frequency of the voltage in the grid-supporting producer node.

10. The method as claimed in claim 8 wherein:

according to the fourth proportional control based on a fourth proportionality factor and a reference reactive power assigned to the grid-supporting producer node and a reference voltage assigned to the grid-supporting producer node, the reactive power fed in by the grid-supporting producer node is stipulated on the basis of the amplitude of the voltage in the grid-supporting producer node; or according to the fourth proportional control based on the fourth proportionality factor and the reference reactive current assigned to the grid-supporting producer node and the reference voltage assigned to the grid-supporting producer node, the reactive current fed in by the grid-supporting producer node is stipulated on the basis of the amplitude of the voltage in the grid-supporting producer node.

11. The method as claimed in claim 5, wherein, within a scope of adjusting the first proportional control and the second proportional control and/or the third proportional control and the fourth proportional control, the first proportionality factor and/or the second proportionality factor and/or the third proportionality factor and/or the fourth proportionality factor and/or the reference active power or the reference active current and/or the reference reactive power or the reference reactive current in the respective first grid node and/or the respective second grid node is/are determined.

12. The method as claimed in claim 1, wherein the optimization problem is minimization of the active power provided by the one or more first grid nodes under a secondary condition that the changes in the active power of the one or more first grid nodes and/or the one or more second grid nodes are limited for the respective predefined changes in the active power of the load.

13. The method as claimed in claim 1, wherein the optimization problem is minimization of the changes in the active power of the one or more first grid nodes and/or the one or more second grid nodes for the respective predefined changes in the active power of the load.

14. The method as claimed in claim 1, wherein it is taken into account, as the secondary condition of the optimization problem, that the deviations of the frequencies of the voltages in the grid-forming and/or grid-supporting producer nodes from a reference frequency assigned to the power grid are limited for the respective predefined changes in the active power of the load and/or the deviations of the amplitudes of the voltages in the grid-forming and/or grid-supporting producer nodes from a reference voltage assigned to the respective grid-forming and/or grid-supporting producer node are limited for respective predefined changes in the reactive power of the load.

15. The method as claimed in claim 1, wherein in order to determine the changes in the active power of the one or more second grid nodes, a temporal change in the frequency in the respective second grid node is estimated using a PLL algorithm.

16. The method as claimed in claim 1, wherein the one or more first grid nodes comprise one or more energy stores and/or one or more electrical generators driven using fossil fuel or regeneratively produced fuel.

17. The method as claimed in claim 1, wherein the one or more second grid nodes comprises one or more photovoltaic plants and/or wind power plants.

18. An apparatus for a computer-assisted configuration of an electrical power grid having a plurality of grid nodes, comprising:
   a control unit,
   one or more first grid nodes, connected via power lines, wherein the one or more first grid nodes are connected to the control unit, wherein the one or more first grid node provides active power for a load in the power grid during operation of the power grid, wherein a respective first grid node is a grid-forming producer node in which the amplitude and frequency of the voltage in the respective first grid node are controlled on the basis of the reactive power fed in by the respective first grid node or the reactive current fed in by the respective grid node and, on the basis of the active power fed in by the respective first grid node or the active current fed in by the respective first grid node using a control method,
   one or more second grid nodes connected to the control unit which provide active power for the load in the power grid during operation of the power grid, wherein a respective second grid node is a grid-supporting producer node in the form of a regenerative energy production plant in which, the active power fed in by the respective second grid node or the active current fed in by the respective second grid node and the reactive power fed in by the respective second grid node or the reactive current fed in by the respective second grid node are controlled on the basis of the frequency and amplitude of the voltage in the respective second grid node using a control method,
wherein: the apparatus is set up to carry out a method, in which
   changes in the active power of the respective first grid node and the respective second grid node are determined for respective predefined changes in the active power of the load on the basis of a dynamic model of the power grid;
   the control methods for the respective first grid node and the respective second grid node are adjusted in such a manner that an optimization problem with the aim of operating the power grid in an optimum manner with respect to one or more optimization criteria is solved using the determined changes in the active power of the respective first grid node,
wherein the aim of the optimization problem is to increase the active power provided by the one or more second grid nodes while minimizing the active power provided by the one or more first grid nodes.

19. An electrical power grid having a plurality of grid nodes, comprising:
   one or more first grid nodes, connected via power lines, wherein the one or more first grid node provide active power for a load in the power grid during operation of the power grid, wherein a respective first grid node is a grid-forming producer node in which the amplitude and frequency of the voltage in the first respective grid node are controlled, on the basis of the reactive power fed in by the respective first grid node or the reactive current fed in by the respective first grid node and, on the basis of the active power fed in by the respective first grid node or the active current fed in by the respective first grid node using a control method,
   one or more second grid nodes which provide active power for the load in the power grid during operation of the power grid, wherein a respective second grid node is a grid-supporting producer node in the form of a regenerative energy production plant in which, the active power fed in by the respective second grid node or the active current fed in by the respective second grid node and the reactive power fed in by the respective second grid node or the reactive current fed in by the respective second grid node are controlled on the basis of the frequency and amplitude of the voltage in the respective second grid node using the control method,
wherein the power grid comprises an apparatus for configuring the power grid as claimed in claim 18.

* * * * *